United States Patent [19]
Zimmerman

[11] Patent Number: 5,725,246
[45] Date of Patent: Mar. 10, 1998

[54] AUTOMOBILE FENDER PROTECTING DEVICE

[76] Inventor: Jeff Zimmerman, E. 2921 Rockwell Ave., Spokane, Wash. 99207

[21] Appl. No.: 578,213

[22] Filed: Dec. 26, 1995

[51] Int. Cl.$^6$ ............................................ B60J 11/00
[52] U.S. Cl. ............................................ 280/770; 150/166
[58] Field of Search ............................ 280/770; 150/166

[56] References Cited

U.S. PATENT DOCUMENTS

| | | | |
|---|---|---|---|
| 2,880,015 | 3/1959 | Harben | 280/150 |
| 4,997,229 | 3/1991 | Swanson | 296/136 |
| 5,056,817 | 10/1991 | Fuller | 280/770 |
| 5,195,778 | 3/1993 | Dismuke | 280/770 |
| 5,273,316 | 12/1993 | Infante | 280/770 |
| 5,368,912 | 11/1994 | Reaves | 428/192 |

*Primary Examiner*—Brian L. Johnson
*Assistant Examiner*—Bridget Avery

[57] ABSTRACT

An automobile fender protecting device comprised of a left fender cover covering a left fender of an automobile. A right fender cover covers a right fender of an automobile. A grill cover has an expandable first end portion and an expandable second end portion. The grill cover covers a front section of an automobile. The expandable first end portion is secured to the right fender cover. The expandable second end portion is secured to the left fender cover.

1 Claim, 3 Drawing Sheets

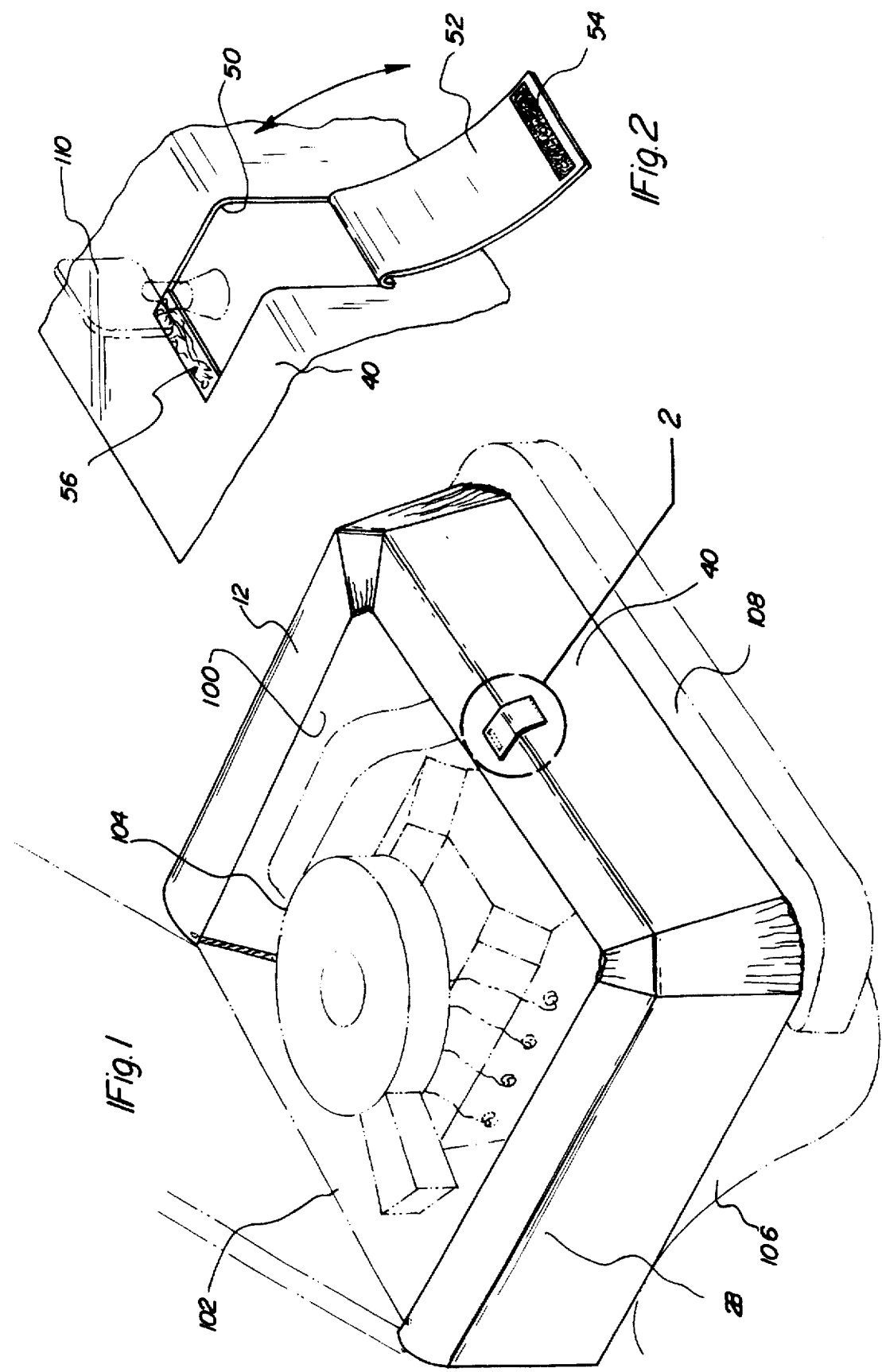

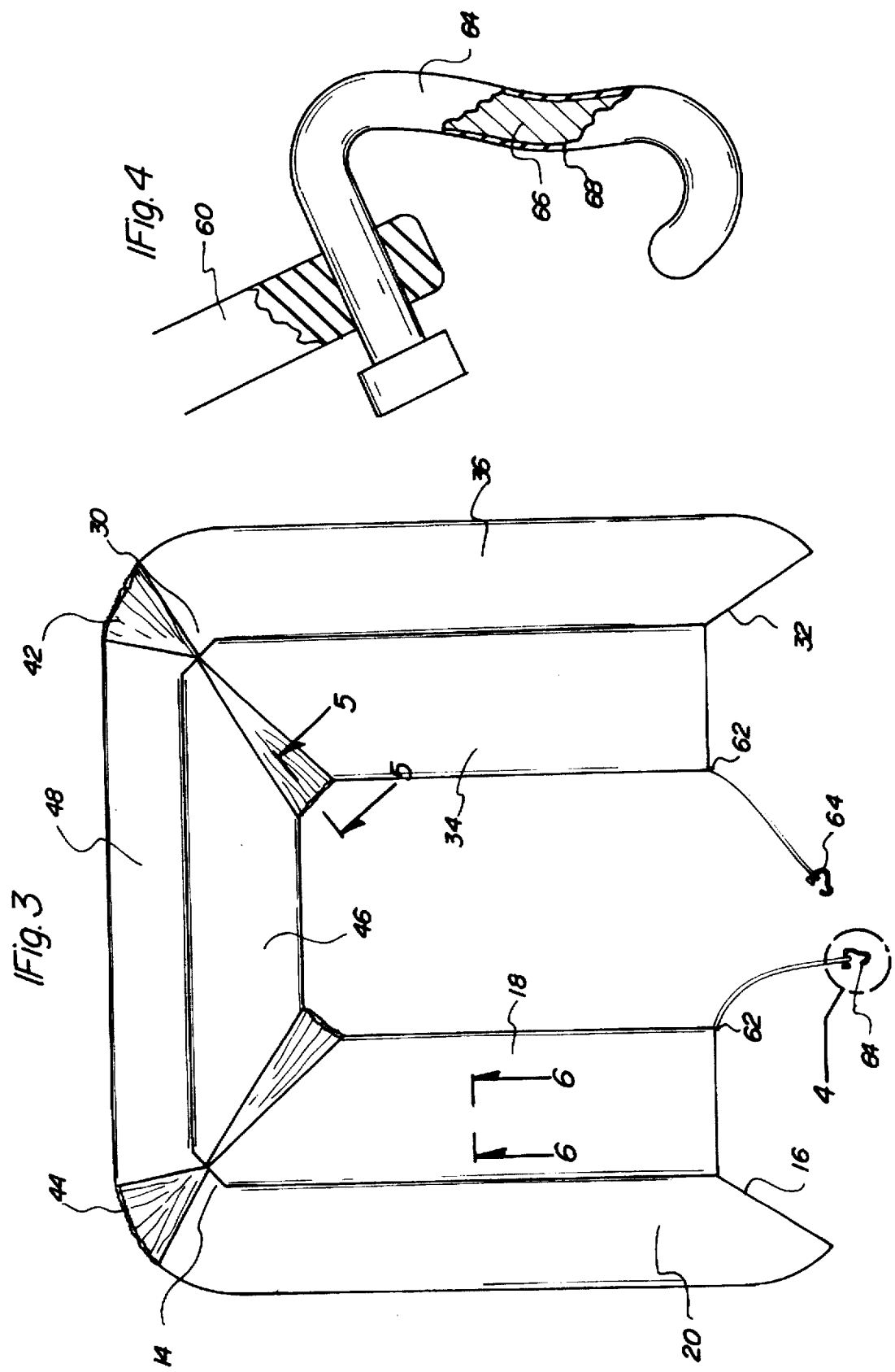

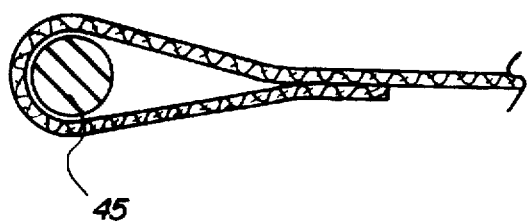
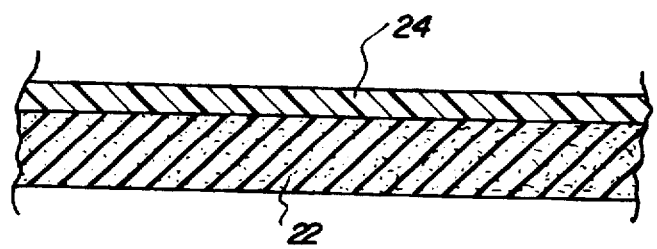

AUTOMOBILE FENDER PROTECTING DEVICE

BACKGROUND OF THE INVENTION

1. Field of the Invention

The present invention relates to an automobile fender protecting device and more particularly pertains to wrapping around fenders and grill area of an automobile for protection thereof with an automobile fender protecting device.

2. Description of the Prior Art

The use of fender covers is known in the prior art. More specifically, fender covers heretofore devised and utilized for the purpose of covering fenders for protection are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,290,618 to Olson et al. discloses an automobile fender protector.

U.S. Pat. No. 5,273,316 to Infante discloses a finish protective cover for a stationary vehicle.

U.S. Pat. No. 4,895,753 to Etter discloses a fender cover.

U.S. Pat. No. 4,884,824 to Radke discloses a magnetic fender cover.

U.S. Pat. No. 4,849,272 to Haney et al. discloses a magnetically securable fender cover apparatus.

U.S. Pat. No. 5,042,836 to Swanson discloses a motor vehicle compartment closure covering apparatus.

While these devices fulfill their respective, particular objective and requirements, the aforementioned patents do not describe an automobile fender protecting device for wrapping around fenders and grill area of an automobile for protection thereof.

In this respect, the automobile fender protecting device according to the present invention substantially departs from the conventional concepts and designs of the prior art, and in doing so provides an apparatus primarily developed for the purpose of wrapping around fenders and grill area of an automobile for protection thereof.

Therefore, it can be appreciated that there exists a continuing need for new and improved automobile fender protecting device which can be used for wrapping around fenders and grill area of an automobile for protection thereof. In this regard, the present invention substantially fulfills this need.

SUMMARY OF THE INVENTION

In the view of the foregoing disadvantages inherent in the known types of fender covers now present in the prior art, the present invention provides an improved automobile fender protecting device. As such, the general purpose of the present invention, which will be described subsequently in greater detail, is to provide a new and improved automobile fender protecting device and method which has all the advantages of the prior art and none of the disadvantages.

To attain this, the present invention essentially comprises a left fender cover having a first end portion and a second end portion. The left fender cover has an upper section and a lower section. The left fender cover covers a left fender of an automobile with the upper section covering an upper part of the left fender and extends into an engine compartment of the automobile and the lower section lays down over a lower part of the left fender. The device includes a right fender cover having a first end portion and a second end portion. The right fender cover has an upper section and a lower section. The right fender cover covers a right fender of an automobile with the upper section covering an upper part of the right fender and extends into an engine compartment of the automobile and the lower section lays down over a lower part of the right fender. The device includes a grill cover having an expandable first end portion and an expandable second end portion. The grill cover has an upper section and a lower section. The grill cover covers a front section of an automobile with the upper section laying over a radiator and core support and the lower section laying down over a grill of the automobile. The expandable first end portion is secured to the first end portion of the right fender cover. The expandable second end portion is secured to the first end portion of the left fender cover. A central portion of the grill cover has a flapped opening therein. The device includes a pair of securement straps each having free ends and hooked ends. One of the free ends is secured to the upper section of the right fender cover at the second end portion thereof. An opposing free end is secured to the upper section of the left fender cover at the second end portion thereof. Each of the hooked ends are securable to a fire wall of an automobile.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automobile fender protecting device which has all the advantages of the prior art fender covers and none of the disadvantages.

It is another object of the present invention to provide a new and improved automobile fender protecting device which may be easily and efficiently manufactured and marketed.

It is a further object of the present invention to provide a new and improved automobile fender protecting device which is of durable and reliable construction.

An even further object of the present invention is to provide a new and improved automobile fender protecting device which is susceptible of a low cost of manufacture with regard to both materials and labor, and which accordingly is then susceptible of low prices of sale to the consuming public, thereby making such an automobile fender protecting device economically available to the buying public.

Still yet another object of the present invention is to provide a new and improved automobile fender protecting device which provides in the apparatuses and methods of the prior art some of the advantages thereof, while simultaneously overcoming some of the disadvantages normally associated therewith.

Even still another object of the present invention is to provide a new and improved automobile fender protecting device for wrapping around fenders and grill area of an automobile for protection thereof.

Lastly, it is an object of the present invention to provide a new and improved automobile fender protecting device comprised of a left fender cover covering a left fender of an automobile. A right fender cover covers a right fender of an automobile. A grill cover has an expandable first end portion and an expandable second end portion. The grill cover covers a front section of an automobile. The expandable first end portion is secured to the right fender cover. The expandable second end portion is secured to the left fender cover.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the automobile fender protecting device constructed in accordance with the principles of the present invention.

FIG. 2 is a perspective view of the hood ornament flap of the present invention.

FIG. 3 is a plan view of the preferred embodiment of the present invention.

FIG. 4 is a side view of the securement hook of the present invention.

FIG. 5 is a cross-sectional view as taken along line 5—5 of FIG. 3.

FIG. 6 is a cross-sectional view as taken along line 6—6 of FIG. 3.

The same reference numerals refer to the same parts through the various Figures.

DESCRIPTION OF THE PREFERRED EMBODIMENT

With reference now to the drawings, and in particular, to FIGS. 1–6 thereof, the preferred embodiment of the new and improved automobile fender protecting device embodying the principles and concepts of the present invention and generally designated by the reference number 10 will be described.

Specifically, it will be noted in the various Figures that the device relates to a new and improved automobile fender protecting device for wrapping around fenders and grill area of an automobile for protection thereof. In its broadest context, the device consists of a left fender cover, a right fender cover, a grill cover, and a pair of securement straps. Such components are individually configured and correlated with respect to each other so as to attain the desired objective.

The device 10 includes a left fender cover 12 having a first end portion 14 and a second end portion 16. The left fender cover 12 has an upper section 18 and a lower section 20. The left fender cover 12 covers a left fender 100 of an automobile 102 with the upper section 18 covering an upper part of the left fender 100 and extends into an engine compartment 104 of the automobile 102 and the lower section 20 lays down over a lower part of the left fender 100. The left fender cover 12 is preferably comprised of a synthetic rubber outer layer 22 and a padded inner layer 24. The padded inner layer serves to protect the automobile 102 from any scratches or other damages that could occur from tools or other items used while repairing the automobile 102. The rubber outer layer 22 is also protective as well as grease resistant and easy to clean.

The device 10 includes a right fender cover 28 having a first end portion 30 and a second end portion 32. The right fender cover 28 has an upper section 34 and a lower section 36. The right fender cover 28 covers a right fender 106 of an automobile 102 with the upper section 34 covering an upper part of the right fender 106 and extends into an engine compartment 104 of the automobile 102 and the lower section 36 lays down over a lower part of the right fender 106. As with the right fender cover 12, the left fender cover 28 is preferably comprised of a synthetic rubber outer layer 22 and a padded inner layer 24.

The device 10 includes a grill cover 40 having an expandable first end portion 42 and an expandable second end portion 44. The grill cover 40 has an upper section 46 and a lower section 48. The grill cover 40 covers a front section 108 of an automobile 102 with the upper section 46 laying over a radiator and core support and the lower section 48 laying down over a grill of the automobile 102. The expandable first end portion 42 is secured to the first end portion 30 of the right fender cover 28. The expandable second end portion 44 is secured to the first end portion 14 of the left fender cover 12. The expandable first end portion 42 and the expandable second end portion 44 allowing the device to be stretched to fit different sized automobiles. Each of the expandable end portions 42,44 is comprised of an elastic band 45 expanding through a lower end and an upper end of the respective expandable end portions 42,44. A central portion of the grill cover 40 has a flapped opening 50 therein. The flapped opening 50 has a flap portion 52 that can be folded down to allow a hood ornament 110 of the automobile to be passed through the flapped opening 50. The flap portion 52 has a hook and loop fastener 54 on an upper portion thereof corresponding with a hook and loop fastener 56 on the central portion of the grill cover 40 for closure of the flap portion 52 over the flapped opening 50.

The device 10 includes a pair of securement straps 60 each having free ends 62 and hooked ends 64. One of the free ends 62 is secured to the upper section 34 of the right fender cover 28 at the second end portion 32 thereof. An opposing free end 62 is secured to the upper section 18 of the left fender cover 12 at the second end portion 16 thereof. Each of the hooked ends 64 are securable to a fire wall of an automobile 102. The hook ends 64 are comprised of a bendable metal interior layer 66 and a rubber coated outer layer 68.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An automobile fender protecting device for wrapping around fenders and grill area of an automobile for protection thereof comprising, in combination:

a left fender cover having a first end portion and a second end portion, the left fender cover having an upper section and a lower section, the left fender cover covering a left fender of an automobile with the upper section covering an upper part of the left fender and extending into an engine compartment of the automobile and the lower section laying down over a lower part of the left fender;

a right fender cover having a first end portion and a second end portion, the right fender cover having an upper section and a lower section, the right fender cover covering a right fender of an automobile with the upper section covering an upper part of the right fender and extending into an engine compartment of the automobile and the lower section laying down over a lower part of the right fender;

a grill cover having a stretchably expandable first end portion and a stretchably expandable second end portion, the grill cover having an upper section and a lower section wherein the stretchably expandable first and second end portion extend between the upper section and lower section of the grill cover, the grill cover covering a front section of the automobile with the upper section laying over a radiator and core support and the lower section laying down over a grill of the automobile, the stretchably expandable first end portion secured to the first end portion of the right fender cover, the stretchably expandable second end portion secured to the first end portion of the left fender cover, a central portion of the grill cover having a flapped opening therein;

a pair of securement straps each having free ends and hooked ends, one of the free ends secured to the upper section of the right fender cover at the second end portion thereof, an opposing free end secured to the upper section of the left fender cover at the second end portion thereof, each of the hooked ends securable to a fire wall of an automobile.

* * * * *